US007830305B2

(12) United States Patent
Boling et al.

(10) Patent No.: US 7,830,305 B2
(45) Date of Patent: Nov. 9, 2010

(54) LOCATOR BEACON SYSTEM HAVING GLOBAL COMMUNICATION CAPABILITY

(75) Inventors: Brian M. Boling, Knoxville, TN (US); Ronald D. Bishop, Trabucco Canyon, CA (US)

(73) Assignee: PROCON, Inc., Knoxville, TN (US)

(*) Notice: Subject to any disclaimer, the term of this patent is extended or adjusted under 35 U.S.C. 154(b) by 616 days.

(21) Appl. No.: 11/693,160

(22) Filed: Mar. 29, 2007

(65) Prior Publication Data

US 2009/0224966 A1 Sep. 10, 2009

Related U.S. Application Data

(63) Continuation-in-part of application No. 11/669,239, filed on Jan. 31, 2007, and a continuation-in-part of application No. 10/934,029, filed on Sep. 3, 2004, now Pat. No. 7,215,282.

(60) Provisional application No. 60/764,419, filed on Feb. 2, 2006.

(51) Int. Cl.
*G01S 19/17* (2010.01)
*G08B 1/08* (2006.01)

(52) U.S. Cl. .............. 342/357.55; 340/7.5; 340/825.49; 455/404.2

(58) Field of Classification Search .............. 342/357.1, 342/357.07, 357.09; 340/539.13, 539.32, 340/825.49, 7.5; 455/404.2
See application file for complete search history.

(56) References Cited

U.S. PATENT DOCUMENTS 5,519,403 A 5/1996 Bickley et al.

| 5,724,045 | A | 3/1998 | Kawakami |
| 6,275,164 | B1 | 8/2001 | MacConnell et al. |
| 2002/0118796 | A1* | 8/2002 | Menard et al. ............... 455/404 |
| 2004/0047461 | A1* | 3/2004 | Weisman et al. ....... 379/202.01 |

(Continued)

FOREIGN PATENT DOCUMENTS

CA 2133673 A1 * 4/1996

(Continued)

OTHER PUBLICATIONS

COSPAS-SARSAT Search and Rescue System, NASA and NOAA, 2000.*

*Primary Examiner*—Thomas H Tarcza
*Assistant Examiner*—Fred H Mull
(74) *Attorney, Agent, or Firm*—Luedeka, Neely & Graham, P.C.

(57) ABSTRACT

The invention provides an emergency communication device capable of transmitting an emergency alert signal using more than one wireless communication system. When a commercial wireless carrier network is available, the device transmits the emergency alert signal to a central monitoring service via the wireless carrier network. When no wireless carrier network is available, the device transmits the emergency alert signal to an emergency search and rescue (SAR) satellite system. The device includes a first transmitter for transmitting the emergency alert signal to the SAR satellite system, a receiver for receiving location determination signals from Global Positioning System (GPS) satellites, and a second transmitter for transmitting the emergency alert signal by way of the wireless carrier network. In preferred embodiments, the first transmitter is a personal locator beacon transmitter compatible with the Cospas-Sarsat satellite system and the second transmitter is a Global System for Mobile communications (GSM) transmitter.

17 Claims, 5 Drawing Sheets

U.S. PATENT DOCUMENTS

| | | |
|---|---|---|
| 2004/0140928 A1* | 7/2004 | Cleghorn ............... 342/357.07 |
| 2005/0143049 A1* | 6/2005 | Hoke ....................... 455/404.2 |
| 2006/0092043 A1 | 5/2006 | Lagassey |
| 2006/0095199 A1 | 5/2006 | Lagassey |
| 2006/0148423 A1 | 7/2006 | Sharpe |
| 2006/0181411 A1 | 8/2006 | Fast et al. |
| 2007/0287430 A1* | 12/2007 | Hosain et al. ............ 455/414.1 |
| 2008/0261556 A1* | 10/2008 | McLellan ................ 455/404.2 |

FOREIGN PATENT DOCUMENTS

WO    WO 2007/004999 A1 *   1/2007

* cited by examiner

LOCATOR BEACON SYSTEM HAVING GLOBAL COMMUNICATION CAPABILITY

This application claims priority as a continuation-in-part to U.S. patent application Ser. No. 10/934,029 filed Sep. 3, 2004, titled TWO-WAY DISTRESS ALERT AND EMERGENCY LOCATION APPARATUS AND METHOD, now U.S. Pat. No. 7,215,282, and U.S. patent application Ser. No. 11/669,239 filed Jan. 31, 2007, titled GLOBAL EMERGENCY ALERT NOTIFICATION SYSTEM, which claims priority to provisional patent application Ser. No. 60/764,419 filed Feb. 2, 2006, titled GLOBAL EMERGENCY SYSTEM.

FIELD

This invention relates to the field of emergency beacon devices. More particularly the invention relates to a distress alert and emergency location device having two-way communication capabilities that is operable to transmit emergency alert messages using multiple communication systems.

BACKGROUND

Those with a penchant for outdoor adventure, such as hikers, mountain climbers and whitewater enthusiasts, often find themselves in locations where standard communication services are lacking. Although cellular telephone towers seemingly are popping up everywhere one looks, in fact there are still many locations in the world were cellular telephone service is not available. In these out of the way areas, standard cellular phones are of little if any use in an emergency situation.

Dropouts in cellular telephone coverage are also a concern in the field of asset tracking services, such as services for locating stolen vehicles and tracking/monitoring valuable cargo or shipments of hazardous materials (HAZMAT). Currently there are several large commercial overland vehicle-tracking entities that offer what is referred to as "nationwide" HAZMAT vehicle tracking services. In order to provide location-based services, these tracking organizations require access to local wireless carrier networks for transmission of location and event messages from devices carried on the vehicle. The wireless carriers that provide the tracking companies access to their networks are primarily in the business of marketing voice and data services to millions of consumers of cellular telephones and handheld portable data communications devices. The majority of the wireless carriers' customers are located in large to moderately sized metropolitan service areas. For this reason, the wireless carriers have concentrated on constructing their systems and building their subscriber bases in densely populated regions.

As a result of the wireless carriers concentrating their efforts in the more populated areas, there are many large holes in the "footprint" of cellular coverage across the nation. Thus, during a typical coast-to-coast trip a truck transporting hazardous materials will for the majority of its travel time be outside of the wireless carriers' coverage boundaries. When a HAZMAT vehicle is traveling through any of these holes in wireless service coverage, a tracking device on the vehicle would be unable to transmit location data or event alarms.

If a terrorist organization was planning to commandeer a HAZMAT shipment on a truck traveling on the nation's highways, they could simply access the Internet and obtain the RF coverage maps provided by the different wireless service providers. Based on these maps, they could plan a roadside attack to take place in a remote area that does not have the wireless coverage needed for the real-time reporting of the attack and the location of the event.

In an attempt to overcome this lack of wireless coverage, the "nationwide" HAZMAT tracking companies typically employ an internal continuous GPS data logging technique. This method requires that an onboard microprocessor in the on-board tracking unit obtain GPS-NMEA location data at set intervals and record it in an internal time/date-stamped memory location. That information can later be transmitted to the central tracking center only after the HAZMAT truck re-enters an area where wireless service is available. If a forced takeover event occurred during the time that the truck was outside a wireless coverage area, the on-board device could only record the event, as it would be unable to report it in real-time. Clearly, this does not provide secure "nationwide real-time reporting." This is an unacceptable situation if HAZMAT security requirements require the ability to send an immediate notification of a takeover event in any geographical location.

Thus, what is needed is a totally ubiquitous location-based reporting system that operates in conjunction with central support network. The reporting system should provide solid safeguards for the protection of hazardous materials during transport and protection of the driver's security in the event of a hostile takeover or an accident. The needed reporting system and network should have a location determination and communication system that is able to operate anywhere in the nation completely independently of the commercial wireless communications carriers.

SUMMARY

The above and other needs are met by communication device that is capable of transmitting alert signals within more than one wireless communication system. When a commercial wireless carrier is available, the device transmits an alert signal to a central monitoring service via the commercial carrier network. When no commercial wireless carrier is available, the device transmits an alert signal that is received by an emergency alert satellite system. In this case, the alert signal is relayed from the emergency alert satellite system to the central monitoring service via a secure network, such as a virtual private network. Details of the communication device and modes of operation are described in more detail hereinafter.

One embodiment of the invention provides an emergency communication apparatus for transmitting an emergency alert signal in an emergency situation. The apparatus includes a first transmitter for transmitting the emergency alert signal to a first satellite system used in providing assistance in search and rescue operations, a receiver for receiving location determination signals from a second satellite system used in determining location information, and a second transmitter for transmitting the emergency alert signal by way of a wireless communication network. In preferred embodiments, the first transmitter is a personal locator beacon transmitter for transmitting the emergency alert signal at about 406 MHz to the Cospas-Sarsat satellites, the receiver is a Global Positioning System (GPS) receiver, and the second transmitter is a Global System for Mobile communications (GSM) transmitter.

Another embodiment of the invention provides an emergency communication apparatus for transmitting emergency alert signals in an emergency situation. In this embodiment, the apparatus includes a logic module for determining an event code indicative of the nature of the emergency situation. The apparatus also includes a personal locator beacon transmitter for transmitting the emergency alert signals to a satellite system that is used in providing assistance in search and rescue operations. In this embodiment, one or more of the emergency alert signals include information for identifying the personal locator beacon transmitter and one or more of the emergency alert signals include the event code.

In yet another embodiment, the invention provides a search and rescue coordination computer system for processing emergency alert information related to emergency alert signals transmitted from an emergency beacon unit during an emergency situation in an emergency location. Depending on the availability of communication resources in the emergency location, the emergency beacon unit may transmit the emergency alert signals to satellites in a search and rescue satellite system to be relayed to a government rescue coordination center, or the emergency beacon unit may transmit the emergency alert signals via a wireless communication network.

According to this embodiment, the search and rescue coordination computer system includes (1) means for communicating with the government rescue coordination center and receiving the emergency alert information therefrom, (2) means for communicating with the wireless communication network and receiving the emergency alert information there from, (3) means for determining emergency beacon identification information based on the emergency alert information, (4) means for determining information regarding a registered user of the emergency beacon unit based on the emergency beacon identification information, (5) means for determining the emergency location based on the emergency alert information, (6) means for determining a designated local search and rescue agency having responsibility for search and rescue operations based at least in part on the emergency location, and (7) means for communicating information regarding the emergency situation with the designated local search and rescue agency having responsibility for search and rescue operations.

In another aspect, the invention provides a method for transmitting an emergency alert signal from an emergency beacon device in an emergency situation at an emergency location. The method includes the steps of (a) determining whether a wireless communication network is available at the emergency location, and (b) when it is determined that a wireless communication network is unavailable at the emergency location, transmitting the emergency alert signal from the emergency beacon device to a satellite system used in providing assistance in search and rescue operations. In one preferred embodiment, the method also includes (c) transmitting the emergency alert signal by way of the wireless communication network when it is determined that the wireless communication network is available at the emergency location.

In preferred embodiments, step (a) includes determining whether a GSM wireless service provider network is available at the emergency location, step (b) includes transmitting the emergency alert signal from the emergency beacon device to one or more Cospas-Sarsat satellites, and step (c) includes transmitting the emergency alert signal by way of the GSM wireless service provider network.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

In the preferred embodiment, the invention operates in conjunction with a government owned and operated satellite system referred to as Cospas-Sarsat. Cospas-Sarsat is an international satellite system designed to provide distress alert and location data to assist search and rescue operations worldwide. The Cospas-Sarsat system provides support to organizations throughout the world with responsibility for search and rescue operations, whether at sea, in the air or on land. The Cospas-Sarsat system uses spacecraft and ground facilities to detect and locate signals transmitted by distress beacons. The position of an alerting beacon and other related information is forwarded to an appropriate Search and Rescue Point of Contact (SPOC) located near the position of the beacon.

Figure 1:
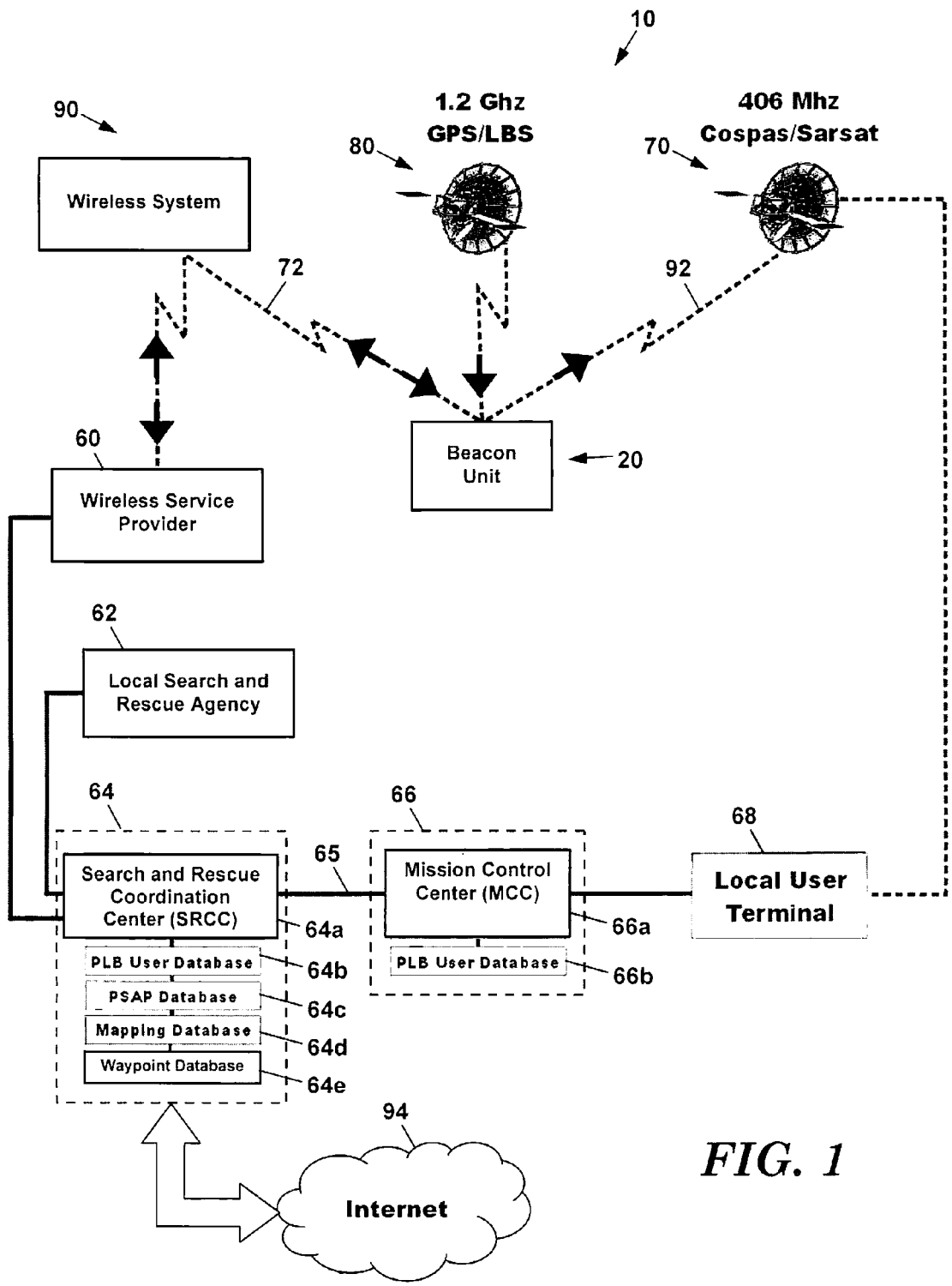
FIG. 1 depicts an emergency communication system in which a distress alert and location device operates according to preferred embodiments of the invention.

FIG. 1 depicts an emergency communication system 10 that includes components of the Cospas-Sarsat system. As shown FIG. 1, the system 10 includes distress radio beacons that transmit signals during distress situations (such as the device 20), instruments on board satellites 70 in geostationary and low-altitude Earth orbits that detect the signals transmitted by the distress radio beacons, a ground receiving station referred to as a Local Users Terminal (LUT) 68 that receives and processes the satellite downlink signal to generate distress alerts, and the Mission Control Center (MCC) 66 that receives alerts from the LUT 68 and forwards them to a Search and Rescue Coordination Center (RCC) 64, to a local search and rescue agency 62 or to another MCC. Although only one LUT 68, MCC 66, SRCC 64 and local SAR agency 62 are represented in FIG. 1, one skilled in the art will appreciate that the system 10 may include more than one of each of these components. Thus, the system 10 is not limited to the simplified representation of FIG. 1.

The U.S. Air Force Rescue Command Center (AFRCC) at Langley Air Force Base in Virginia is an example of an MCC 66. The AFRCC is currently the single point of contact for the coordination of federal resources involved in search and rescue (SAR) missions in the forty-eight contiguous States of the United States. This includes all SAR activity in the region, including "purely civilian" SAR missions.

The AFRCC is staffed twenty-four hours a day by USAF personnel highly trained in SAR coordination. When a rescue beacon is activated, its signal is routed to the AFRCC, creating a "SAR incident." The AFRCC then determines if SAR services are required and if so, opens a "SAR mission" and assumes the responsibility to coordinate SAR services. The typical procedure is to contact one of the designated SAR entities nearest the location of the beacon unit. The local SAR entity, which usually a central state agency, then serves as the on-scene coordinator for the SAR mission. The AFRCC maintains communications with the local SAR entity and coordinates as required with other SAR entities.

The SRCC 64 comprises communication hardware and software for communicating with the MCC 66, a wireless service provider 60 and local search and rescue agencies 62. The SRCC 64 may also communicate with public service answering points (PSAP's), which are physical locations where emergency telephone calls are received and routed to the proper emergency service response agency. In the preferred embodiment, the communication path 65 between the MCC 66 and the SRCC 64 is a virtual private network link, such as established over the Internet. The SRCC 64 depicted in FIG. 1 also includes a database 64b of owners of registered emergency alert devices, a database 64c of local search and rescue agencies, a mapping database 64d and a trip waypoint database 64e.

PROCON, Inc., a private company based in Knoxville, Tenn., has been contracted by the U.S. Air Force (USAF) to act as a civilian SRCC 64 for coordinating local SAR entities in certain SAR events. In particular, the AFRCC coordinates alert notification activities with PROCON in situations where a distress-alerting beacon 20 is uniquely identifiable as a beacon unit sold by PROCON. As described in more detail hereinafter, these beacon units 20 may be carried on one's person, on a boat, installed in a land vehicle or mounted in an aircraft and are activated automatically or by persons in distress. Upon activation, the beacon 20 sends a signal to the Cospas-Sarsat satellites 70 which is forwarded electronically from the MCC 66 to the PROCON SRCC 64 for further response handling.

Radio frequencies in the 406.0-406.1 MHz band have been exclusively reserved for distress beacons operating in conjunction with the Cospas-Sarsat satellites 70. The Cospas-Sarsat system comprises geostationary satellites, referred to as GEOSAR, that provide the ability to detect and locate 406 MHz radio beacon alerts worldwide.

A ground receiving station in the Cospas-Sarsat system that receives and processes 406 MHz distress beacon signals relayed by a Cospas-Sarsat GEOSAR satellite is referred to as a GEOLUT. Due to the extremely large continuous coverage footprint provided by each geostationary satellite, a GEOLUT can produce nearly instantaneous alerting over extremely large areas. However, due to the fact that GEOSAR satellites remain stationary with respect to a distress beacon, a GEOSAR satellite cannot determine a beacon's location using Doppler processing techniques. In view of this, 406 MHz beacons with location protocols allow for the encoding of position data in the transmitted 406 MHz message, thus providing for quasi-real time alerting with position information via the GEOSAR system.

In addition to the geostationary GEOSAR satellites, Cospas-Sarsat includes low-earth polar orbiting satellites, referred to as LEOSAR, that carry receivers for digital 406 MHz beacons. The LEOSAR satellites orbit at an altitude of 844 km inclined 99 degrees from the equator and complete an orbit every 100 minutes. Each LEOSAR satellite carries a Search and Rescue Repeater that receives and retransmits signals anytime the satellite is in view of a ground station, and a Search and Rescue Processor that receives 406 MHz transmissions, provides measurements of the frequency and time, and then retransmits this data in real-time or stores it aboard for later transmission. If the satellite is in view of a ground station when a 406 MHz signal is received, the data is received in real-time. The satellite also stores each signal it receives and continuously downloads this data. If the satellite is not in view of a ground station when it receives a beacon signal, the next ground station that sees that satellite will receive the data. This provides total global coverage for 406 MHz distress signals.

Figure 2:
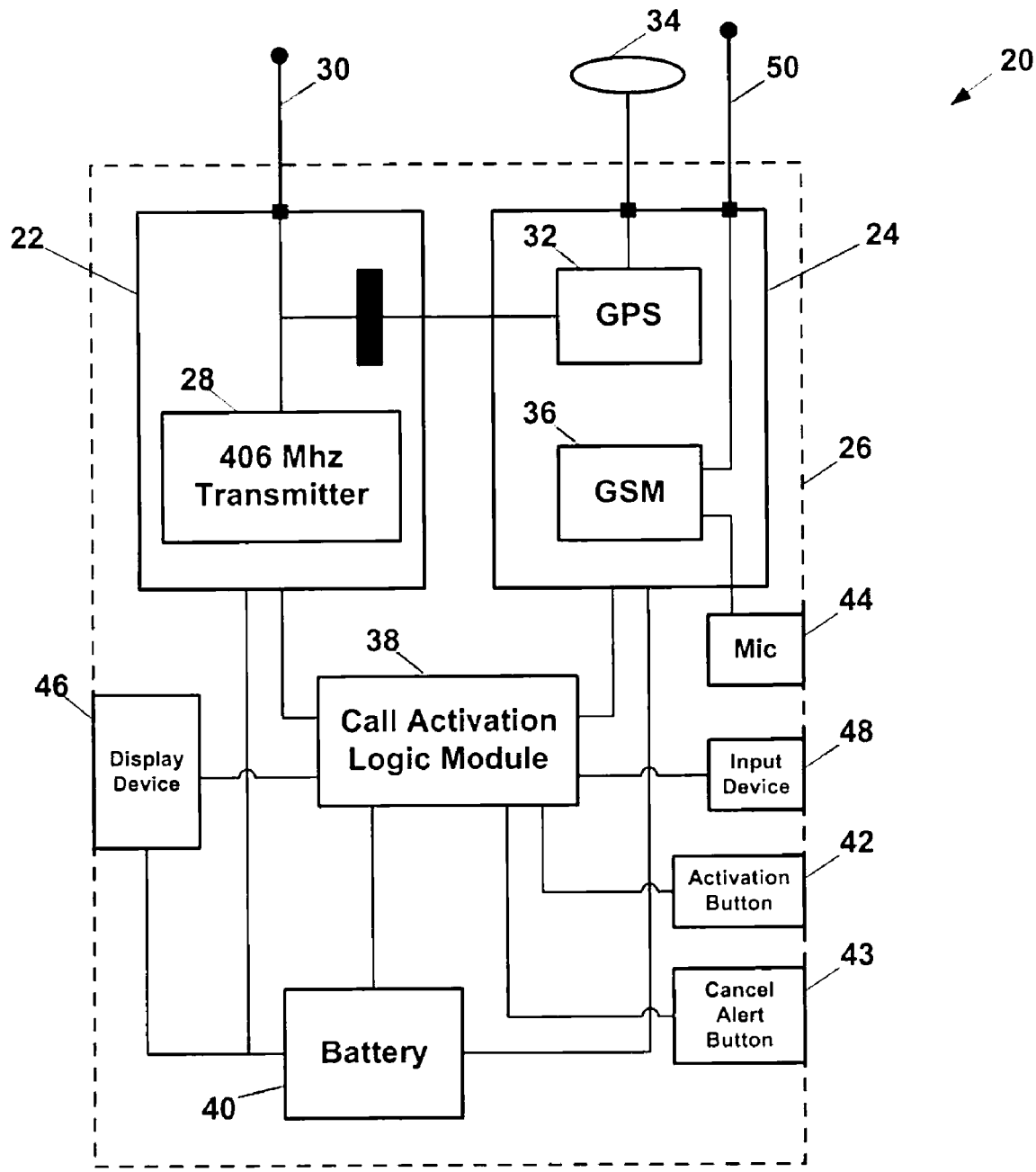
FIG. 2 depicts a functional block diagram of a distress alert and location device according to a preferred embodiment of the invention.

FIG. 2 depicts a locator beacon device 20 having two-way communication capability according to a preferred embodiment of the invention. The device 20 includes a 406 MHz Personal Locator Beacon (PLB) module 22 and a quad-band Global System for Mobile communications (GSM)/Global Positioning System (GPS) module 24 combined in a single housing 26. The PLB module 22 includes a radio frequency transmitter 28 that generates signals at 406 MHz for transmission via the antenna 30 to the Cospas-Sarsat satellites 70 (see FIG. 1).

The GSM/GPS module 24 includes GPS receiver 32 operating at about 1.2 Gigahertz (GHz). By way of a patch antenna 34, the GPS receiver 32 receives signals transmitted from a constellation of government owned and operated location based services (LBS) satellites 80 (see FIG. 1). Based on signals received from at least three satellites, the GPS receiver 32 generates longitude/latitude data corresponding to the location of the device 20. In the preferred embodiment of the invention, the GPS receiver 32 processes the longitude/latitude results into a National Marine Electronics Association standard (NMEA) format that may be provided to the transmitter 28 for transmission to the Cospas/Sarsat satellites 70.

The GSM module also includes a GSM transceiver 36, such as a quad-band transceiver provided in a GSM/GPS module manufactured by Enfora. An antenna 50 for the GSM transceiver 50 is attached to the housing 26 of the device 20.

In the preferred embodiment of FIG. 2, a call activation logic module 38 maintains a constant RF vigilance program that measures the relative signal strength indications (RSSI) of the GSM carriers of the wireless network 90 (see FIG. 1). In this manner, the call activation logic module 38 determines the real-time availability of signals from GSM carriers on all four GSM frequency bands.

Power for the device 20 is provided by a power supply/distribution module 40. In the portable embodiment of the device 20 depicted in FIG. 2, the power supply 40 comprises one or more batteries. In a most preferred embodiment, the power supply 40 comprises a rechargeable battery pack to supply power to the GPS/GSM module 24 and a separate long-life (5-10 year) lithium-ion battery pack to supply power to the beacon module 22.

Preferred embodiments of the beacon unit 20 include a single emergency alert button 42. In the portable embodiment of FIG. 2, the button 42 is mounted on the housing 26 of the unit and is preferably disposed beneath a removable protective cover that prevents inadvertent activation. Some embodiments also include a cancel alert button 43, the function of which is described in more detail below.

Figure 4A:
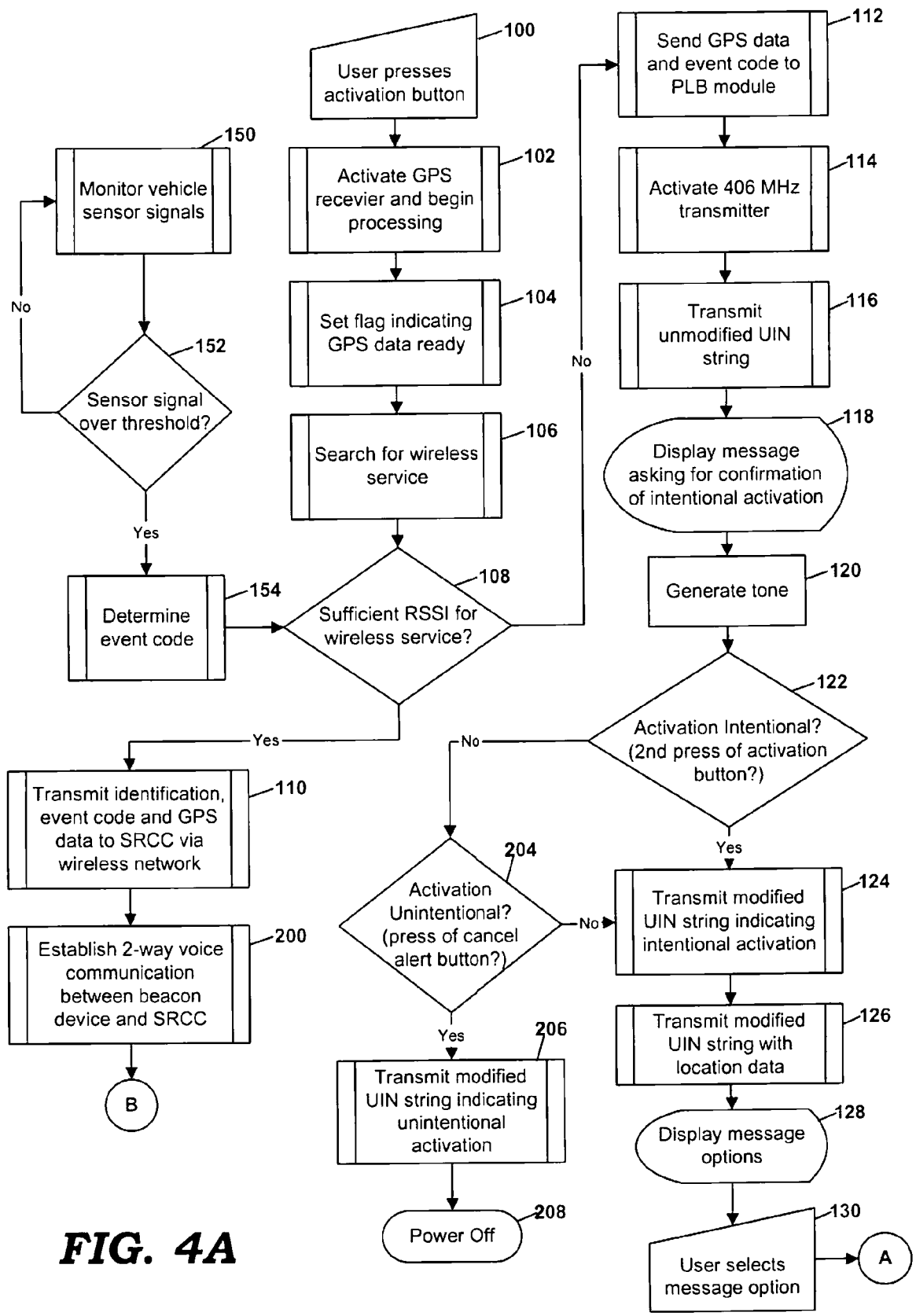
FIGS. 4A and 4B depict a flow diagrams of a method of operating a distress alert and location device within an emergency communication system according to a preferred embodiment of the invention.
Figure 4B:
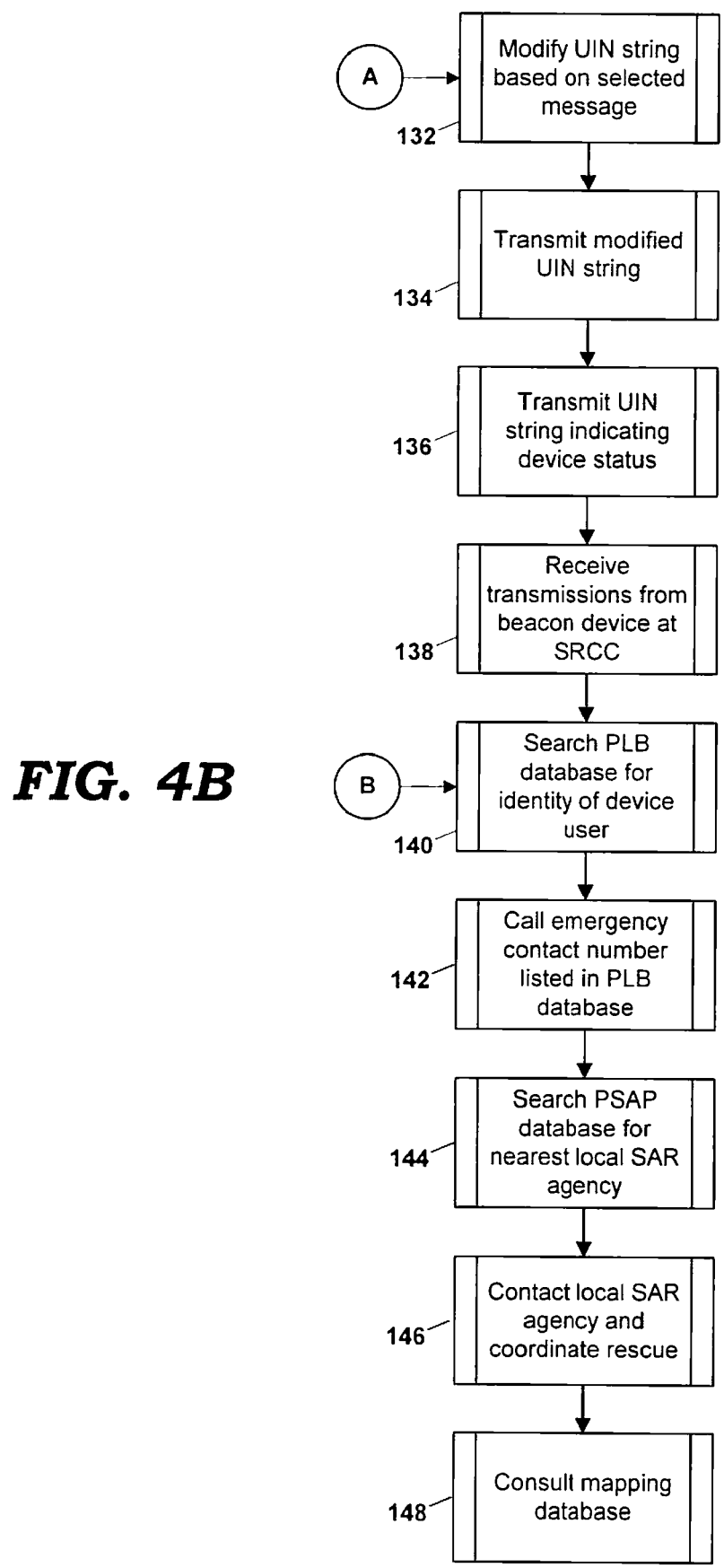

A preferred method of operation of the device 20 within the communication system 10 is depicted in FIGS. 4A and 4B. In an emergency situation, a user preferably activates the device 20 by pressing the activation button 42 (step 100 in FIG. 4A). Upon activation, power is applied to the GPS receiver 32 which begins searching for signals from the GPS satellites 80 (step 102). Once the GPS receiver 32 has received signals from a sufficient number of GPS satellites 80, the receiver 32 preferably formats latitude/longitude location information according to the NMEA standard and sets a flag indicating to the logic unit 38 that a location information packet is ready (step 104).

Also upon activation, the call activation logic module 38 determines if GSM services are available in a local wireless carrier network 90 (step 106). If GSM service is available (step 108), a cellular call is initiated to the PROCON SRCC 64 (such as via a 1-800 number). The GPS location data and other pertinent data is then transmitted to the PROCON SRCC 64 via the wireless network 90 and the GSM service provider 60, preferably using General Packet Radio Service (GPRS) for response processing (step 110). In one embodiment of the invention, the two-way voice cellular call from the beacon unit 20 is directed to an operator at the PROCON SRCC 64 (step 200) who may view a display screen showing a map on which the location of the beacon unit 20 is indicated. The display screen may also display a message indicating the nature of the emergency or urgency. In this embodiment, the operator may then access the database 64c to determine the appropriate emergency responder to contact in the local area where the beacon unit 20 is located (step 140 in FIG. 4B). The operator then takes the necessary steps to contact the local emergency responder and provide them the information needed to respond to the emergency situation (steps 142-148).

In alternative embodiments, communication between the beacon unit 20 and the CRCC 64 is completely automated, with no human operator in the loop.

If the call activation logic module 38 does not detect sufficient RSSI from any GSM carrier (step 108), it will request that the GSM/GPS module 24 provide the PLB module 22 the most current GPS data and an event code (step 112). The 406 MHz transmitter 28 is then activated to transmit the GPS and event code data to the PROCON SRCC 64 via the Cospas-Sarsat satellites 70, the LUT 68 and the MCC 66 as described herein (step 114).

Upon power-up, the transmitter 28 warms up and begins transmitting RF signal bursts at specified intervals, preferably at 406 MHz. In each burst, the transmitter 28 transmits the Unique Identification Number (UIN) that was assigned to the PLB transmitter module 22 and stored in memory within the module 22 during manufacture. Preferably, in the first transmission burst, the UIN is transmitted in an unmodified string (step 116). As discussed below, the UIN string is modified in later transmissions to communicate other information to the Cospas/Sarsat system.

At a preprogrammed time after power-up, the logic unit 38 generates a locally timed signal that triggers the display of a preprogrammed message on the display device 46 requesting the user confirm that activation of the device 20 was intentional (step 118). Preferably, at this time a piezo buzzer 38 or other tone generator sounds to alert the user to the message displayed on the display device 46 (step 120). In the preferred embodiment, the user indicates the activation was intentional by again pressing the activation button 42. The displayed message may also instruct the user to press the cancel alert button 43 if the activation was unintentional.

If there is no second press of the activation button 42 (step 12) and no press of the cancel alert button 43 (step 204) within a predetermined time after displaying the message of step 118, then the beacon unit 20 carries out the operations described hereinafter beginning at step 124. If the user does press the cancel alert button 43 (step 204), the next transmission from the 406 MHz transmitter 28 will include a UIN string that has been modified to indicate that the activation of the device was unintentional (step 206). In the preferred embodiment, the last four digits of the UIN string are set to a predetermined numerical code (such as 0102) indicating that the activation was unintentional. At this point, the beacon unit 20 automatically turns off power to the beacon transmitter 28 (step 208) and the unit 20 goes back into a standby mode awaiting the next activation event.

Referring again to step 122, if the user presses the activation button 42 a second time, the next transmission from the 406 MHz transmitter 28 will include a UIN string that has been modified to indicate that the activation of the device was intentional (step 124). In the preferred embodiment, the last four digits of the UIN string are set to a predetermined numerical code (such as 0101) indicating that the activation was intentional.

Preferably, in the next set of transmissions from the transmitter 28, the last four digits of the UIN string are modified according to Location Protocol Beacon Transmission standards to include the NMEA longitude/latitude data generated by the GPS receiver 32 (step 126). Those transmissions occur at set intervals compliant with the Cospas/Sarsat system procedures until the entire GPS longitude/latitude data file has been received by the MCC 66 and passed along to the SRCC 64.

In a preferred embodiment of the invention, the last four digits of the UIN of the PLB module 22 may be used to communicate other types of information from the device 20 to the SRCC 64 via the Cospas/Sarsat satellites 70 and the MCC 66. For example, after the user presses the activation button 42 a second time (to indicate an intentional activation), a menu of preprogrammed event notification messages are displayed on the display device 46 from which the user may choose (step 128). For example, one of the event notification message options may be "Urgent—Medical Assistance Needed." The message option is selected (such as by highlighting the message on the display device 46) using an input device 48, such as a 4-position toggle button (left, right, up, down arrow) (step 130).

Other preprogrammed event notification message options may include messages indicating vehicle theft, vehicle breakdown, vehicle hijacked/car-jacked, confirmation of arrival at predetermined check point, fire alert, nuclear material alert, chemical alert, and so on.

Based on the message selected by the user, the logic unit 38 sets one or more digits of the UIN to correspond to a predetermined code for the selected message (step 132). In the preferred embodiment of the invention, the message is encoded in the last four digits of the UIN. However, it should be appreciated that fewer or more of the UIN digits may be used. The modified UIN is then transmitted by the PLB transmitter 28 to the MCC 66 by way of the Cospas/Sarsat satellites 70, and the MCC 66 transfers the information to the SRCC 64 (step 134). Using this communication method, practically any type of preprogrammed message may be transmitted from the device 20 to the SRCC 64 via the Cospas/Sarsat system. For example, based on a four-digit coded string in the UIN, up to 9999 different messages may be encoded and transmitted from the device 20 to the SRCC 64.

In a preferred embodiment, the device 20 also transmits codes representative of the status of the device 20 (step 136). For example, codes can be programmed to represent the remaining power of the device battery 40. The device 20 may transmit these status codes periodically so that search and rescue personnel will know how much battery life the device 20 has remaining as the search is ongoing.

The 406 MHz transmissions from the beacon device 20 are received by the Cospas-Sarsat satellites 70 and forwarded to the SRCC 64 as described previously (step 138). Once the SRCC 64 acquires the UIN of the emergency device 20, the PLB user database 64b is searched for that UIN to determine to whom that particular device 20 is registered (step 140). Based on the information stored in the database 64b, personnel at the SRCC 64 may call an emergency contact phone number the device user provided in the event of emergency (step 142). In this manner, the personnel at the SRCC 64 can inform the contact person of the emergency and possibly receive information from the contact person that may be helpful in the search and rescue operation.

Once the SRCC 64 has acquired the location of the emergency device 20, the PSAP database 64c is searched to determine the local search and rescue agency 62 that is nearest the coordinates of the device 20 (step 144). Personnel at the SRCC 64 may then contact the local agency 62 to inform them of the alert transmission from the emergency device 20 and the location coordinates (step 146). The mapping database 64d may be consulted to determine what roads or landmarks are near the location of the device 20, and the nature of the nearby terrain (step 148). The SRCC 64 may provide such information to the local agency 62 to aid in planning and executing the search and rescue.

Figure 3:
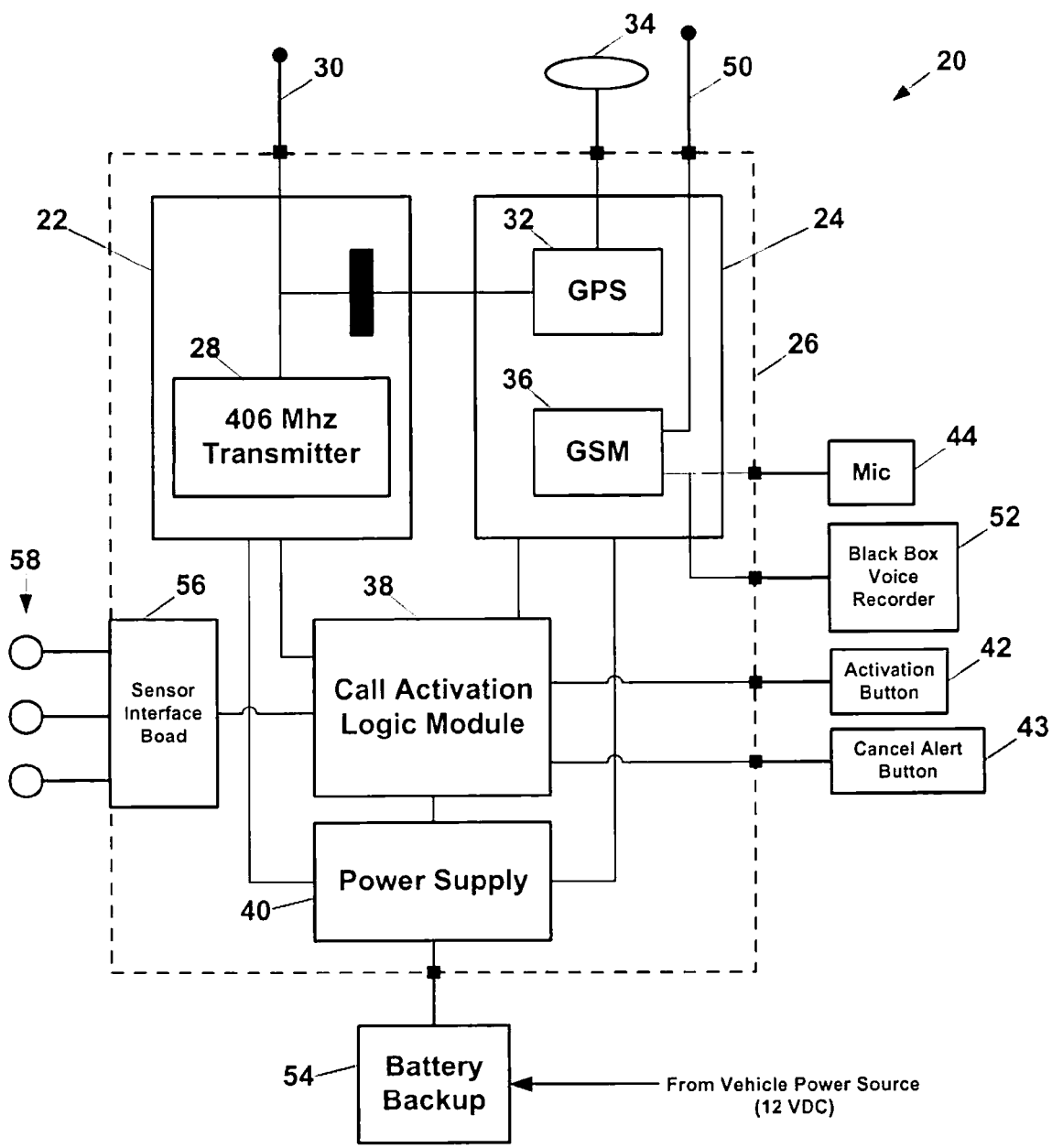
FIG. 3 depicts a functional block diagram of a distress alert and location device according to an alternative embodiment of the invention.

An alternative embodiment of the beacon device 20 is depicted in FIG. 3. This embodiment of the device 20 is particularly suited for installation in a vehicle, such as a truck, train, boat or aircraft. In this embodiment, the PLB module 22, GSM/GPS module 24, call activation module 38 and power supply module 40 are contained in a housing 26 designed to be installed in an out of the way location within the vehicle, such as under the dash, under a seat, in the trunk or other suitable compartment. In this embodiment, the activation button 42 is located remotely from the housing 26 in a position that the driver/operator of the vehicle may easily reach. A microphone 44 may also be located remotely, such as in a good position for picking up the voice of the driver/operator. In this embodiment, power for the device 20 is supplied by the vehicle power supply, with a battery backup unit 54 provided in case the vehicle power becomes unavailable.

In the embodiment of FIG. 3, the three antenna elements 30, 34 and 50 are housed in a weatherproof fiberglass dome enclosure mounted on the roof of the vehicle or on another structure with a clear view of the sky.

The in-vehicle embodiment of the device 20 preferably includes a sensor interface board 56 for receiving sensor signals from on-board sensors 58. The sensors 58 are for monitoring various operational conditions of the vehicles and may include accelerometers, heat sensors, smoke sensors, glass-break sensors and voltage sensors. In the preferred embodiment, the sensor interface board 56 includes signal conditioning and analog-to-digital conversion circuits for converting the analog sensor signals into digital signals that are monitored by the call activation logic module 38.

As shown in FIG. 3, the device 20 incorporates or interfaces with a "black box" type voice recorder unit 52, also referred to as a "cockpit recorder" unit. In the event of an emergency, this unit 52 preferably records all of the in-vehicle audio activities. In the preferred embodiment, the same recording device 52 also stores the most recent 72 hours of location-based data logging information. This information may include (1) the vehicle operator's log-in identification information via Internet or using SMS (particularly useful in commercial trucking applications), (2) GPS location data, (3) speed and direction data, (4) periods of inactivity (vehicle not in motion) and (5) GSM/RSSI log with GSM carrier identification information.

In a preferred embodiment, the device 20 is programmed to automatically transmit one of several preprogrammed event notification messages depending on the situation. As described above, these messages are preferably encoded as one or more digits of the UIN of the PLB module 22. One type of event notification message is a driver initiated alert such as is generated when the driver/operator of the vehicle presses the activation button 42. (See step 100 et seq. in FIGS. 4A and 4B.) Other event notification messages include sensor initiated alerts (such as from crash, glass-break, heat or smoke sensors), late-to-next-check-point alerts, battery disconnect alerts, significant change of direction alerts, mechanical failure alerts, extended non-activity alerts and weather-related trip interruption alerts.

For example, as depicted in FIGS. 3 and 4A, the call activation logic module 38 continuously monitors the sensor signals from the sensor interface board 56 (step 150). When any of these signals exceed the corresponding threshold level (step 152), the logic module 38 determines the appropriate event code based on which sensor or sensors are over threshold (step 154). For example, if an accelerometer sensor indicates a sudden deceleration event, perhaps accompanied by a glass break event, the logic module 38 determines an event code corresponding to a vehicle crash. A glass break event alone may indicate a vehicle break in. A smoke and/or heat event may indicate a fire. Once a sensor over-threshold event is detected, the device 20 proceeds to transmit the event code and location data, either through the GSM wireless network or the Cospas-Sarsat network, as set forth in FIG. 4A beginning at step 108.

A preferred embodiment of the invention incorporates Assisted GPS (A-GPS) which provides the ability to obtain location data in places where standalone GPS may not work, such as urban canyons and inside buildings. In these circumstances, the user's position is calculated using information provided by an assisted network. The information obtained can be in the form of time aiding (to narrow the search range of GPS signals), approximate location information or GPS ephemeris data. In an A-GPS system, signals are collected at the GPS receiver and sent to an A-GPS network server where a location is calculated using network-provided aiding information. The aiding information from the network augments the ambient GPS signals, which results in better location fixes in GPS-challenged environments. Both network and standalone GPS location technologies have inherent weaknesses, resulting in reduced accuracy, decreased availability and higher implementation costs. A-GPS utilizes the complementary nature of both approaches to overcome situational weaknesses experienced by either network or GPS approaches working alone. The benefits of Assisted GPS approach include maximum availability, increased sensitivity, higher accuracy, lower complexity and a rapid time-to-first-fix.

In addition to A-GPS capability, a preferred embodiment of the invention provides "Assisted 406 MHz Location Determination" implemented at the SRCC 64. Conventional GPS technology uses a 12-channel GPS receiver in order to obtain signals from the orbiting constellation of GPS satellites. The 406 MHz emergency beacons perform in exactly the opposite manner in that they transmit signals to the Cospas-Sarsat satellites. According to a preferred embodiment of the invention, the LEOSAR and GEOSAR satellites work in concert to forward data used in processing the satellite locations at to the SRCC 64 via the MCC 66. The SRCC 64 operated by PROCON, Inc. gathers the detailed satellite data that includes the actual positions of all of the GEOSAR and LEOSAR satellites in the Cospas-Sarsat constellation 70. With this data, the PROCON SRCC 64 provides baseline ephemeris type information and clock data for calculating improved acquisition times, sensitivity and accuracy. When an emergency alert is initiated by a beacon unit 20, the PROCON SRCC 64 uses the detailed position information obtained from the Cospas-Sarsat satellites 70 to determine whether the beacon unit 20 is presently in a view of one or more specific satellites and to anticipate the next satellite that will receive the beacon signal. This technique further enhances the determination of the geographic location of the transmitting beacon unit 20.

In a preferred embodiment of the invention, the device 20 provides location information to the PROCON SRCC 64 using four different processes acting independently or in concert:

(1) The GPS receiver 32 on the GSM/GPS module 24 provides autonomous longitude and latitude data which is transmitted by the GSM transceiver 36 (using GPRS or SMS) via the wireless network 90 and the GSM service provider 60 to the PROCON SRCC 64.

(2) The GPS receiver 32 on the GSM/GPS module 24 provides A-GPS location information via the wireless network 90 and the GSM service provider 60 to the PROCON SRCC 64 using a subcontracted A-GPS entity, such as Global Locate, Inc.

(3) The GPS receiver 32 on the GSM/GPS module 24 provides longitude and latitude information to the PLB module 22 which transmits the data to the PROCON SRCC 64 via the Cospas-Sarsat satellites 70, the LUT 68 and the MCC 66.

(4) The 406 MHz transmitter 28 transmits the Doppler Satellite Location Determining Data which is received by a LEOSAR satellite passing over the transmitting beacon. The LEOSAR satellite sends that data to the GEOSAR satellite which transmits the data via the LUT 68 and the MCC 66 to the SRCC 64. The location of the beacon 20 transmitting the alert is then calculated at the SRCC 64 using the "Assisted 406 MHz Location Determination" process as described above.

In a preferred embodiment of the invention, the SRCC 64 provides a secure website interface to allow qualified personnel to enter confidential trip data with estimates for arrival times at certain predetermined destinations during a planned trip. Based this input, GPS waypoint coordinates are determined and stored in the waypoint database 64e maintained at the SRCC 64. This waypoint information assists the SRCC 64 in processing alerts and determining the location of an alerting beacon device 20.

The Internet interface to the SRCC 64 may also provide login procedures for registered users of the alert device 20, weather analysis and reporting, detours and road conditions, trip planning and mapping, report generation and messaging.

Thus, the beacon unit 20 of the various embodiments described herein has the capability to respond to immediate life-threatening emergencies, as well as various types of emergencies which are not life-threatening but which may involve loss or damage to property, such as vehicle theft, vehicle break-down, requests for police, requests for fire fighters, and so on. In some preferred embodiments of the invention, calls for assistance in non-life-threatening situations are always channeled via the GSM cell-phone communication link and not via the 406 MHz beacon-satellite link. Accordingly, other than life-threatening emergency calls must rely upon GSM cell-phone coverage.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An emergency communication apparatus for transmitting an emergency alert signal in an emergency situation, the apparatus comprising:
    a portable housing;
    a first transmitter disposed in the portable housing for transmitting the emergency alert signal to a COSPAS-SARSAT search and rescue satellite system used in providing assistance in search and rescue operations;
    a first receiver disposed in the portable housing for receiving location determination signals from a second satellite system used in determining location information;
    a second receiver disposed in the portable housing for receiving wireless communication signals from a wireless communication network;
    a second transmitter disposed in the portable housing for transmitting the emergency alert signal by way of the wireless communication network; and
    a logic module disposed in the portable housing for determining whether the wireless communication network is available based at least in part on the signals received by the second receiver.

2. The apparatus of claim 1 wherein the first transmitter further comprises a personal locator beacon transmitter for transmitting the emergency alert signal at about 406 megahertz.

3. The apparatus of claim 1 wherein the first receiver further comprises a Global Positioning System receiver.

4. The apparatus of claim 1 wherein the second transmitter further comprises a Global System for Mobile communications (GSM) transmitter.

5. The apparatus of claim 1 further comprising the first transmitter for transmitting the emergency alert signal including a code for identifying the first transmitter.

6. The apparatus of claim 1 further comprising the first transmitter for transmitting the emergency alert signal including location information based on the location determination signals received by the first receiver.

7. The apparatus of claim 1 further comprising the first transmitter for transmitting the emergency alert signal including an event code for providing information regarding the emergency situation.

8. The apparatus of claim 1 wherein the second transmitter and second receiver are components of a wireless communication transceiver module.

9. The apparatus of claim 8 wherein the wireless communication transceiver module comprises a Global System for Mobile communications (GSM) transceiver module.

10. The apparatus of claim 1 wherein the first transmitter transmits the emergency alert signal when the logic module determines that the wireless communication network is unavailable.

11. The apparatus of claim 1 wherein the second transmitter transmits the emergency alert signal when the logic module determines that the wireless communication network is available.

12. The apparatus of claim 1 further comprising a single activation button for initiating activation of the apparatus to transmit the emergency alert signal.

13. The apparatus of claim 1 further comprising a microphone and a recording device for recording audio signals received by the microphone.

14. The apparatus of claim 1 further comprising:
a sensor interface for receiving at least one sensor signal indicative of whether an emergency situation exists; and
the logic module for initiating activation of the apparatus to transmit the emergency alert signal when the at least one sensor signal indicates the existence of an emergency situation.

15. An emergency communication apparatus for transmitting an emergency alert signal in an emergency situation, the apparatus comprising:
a portable housing;
a personal locator beacon transmitter disposed in the portable housing for transmitting the emergency alert signal to one or more COSPAS-SARSAT satellites;
a Global Positioning System (GPS) receiver disposed in the portable housing for receiving location determination signals from one or more Global Positioning System satellites;
a wireless transceiver disposed in the portable housing for receiving wireless communication signals from a wireless communication network and for transmitting the emergency alert signal by way of the wireless communication network; and
a logic module disposed in the portable housing for determining whether the wireless communication network is available based at least in part on the signals received by the wireless transceiver.

16. The apparatus of claim 15 wherein the wireless transceiver comprises a Global System for Mobile communications (GSM) transceiver.

17. The apparatus of claim 15 wherein the personal locator beacon transmitter transmits the emergency alert signal at about 406 MHz.

\* \* \* \* \*